United States Patent [19]
Haikawa

[11] Patent Number: 5,378,969
[45] Date of Patent: Jan. 3, 1995

[54] NAVIGATION CONTROL SYSTEM FOR MOBILE ROBOT

[75] Inventor: Yuji Haikawa, Saitama, Japan

[73] Assignee: Honda Giken Kogyo Kabushiki Kaisha, Tokyo, Japan

[21] Appl. No.: 45,840

[22] Filed: Apr. 9, 1993

[30] Foreign Application Priority Data

Apr. 15, 1992 [JP] Japan .................. 4-121431

[51] Int. Cl.$^6$ ............ B25J 11/00; B25J 9/00
[52] U.S. Cl. ............... 318/568.12; 318/568.1; 318/568.16; 180/8.1
[58] Field of Search ............ 318/560–646; 395/80–99; 901/1, 3, 5, 7, 13, 15, 17, 19, 23; 180/7–9; 364/424–426

[56] References Cited

U.S. PATENT DOCUMENTS

| | | | |
|---|---|---|---|
| 4,799,267 | 1/1989 | Kamejima et al. | 901/47 X |
| 4,834,200 | 5/1989 | Kajita | 180/8.1 |
| 4,884,216 | 11/1989 | Kuperstein | 364/513 |
| 4,920,572 | 4/1990 | Sugita et al. | 382/48 |
| 4,940,925 | 7/1990 | Wand et al. | 318/587 |
| 5,001,635 | 3/1991 | Yasutomi et al. | 364/424.02 |
| 5,005,658 | 4/1991 | Bares et al. | 180/8.1 |
| 5,081,585 | 1/1992 | Kurami et al. | 364/424.02 |
| 5,144,685 | 9/1992 | Nasar et al. | 395/88 X |
| 5,151,859 | 9/1992 | Yoshino et al. | 364/424.02 |
| 5,159,988 | 11/1992 | Gomi et al. | 180/8.6 |

FOREIGN PATENT DOCUMENTS 62-97005  5/1987  Japan.
285112  12/1987  Japan.
3184782  8/1991  Japan.

OTHER PUBLICATIONS

Journal of the Artificial Intelligence Association, vol. 5.

Primary Examiner—Paul Ip
Attorney, Agent, or Firm—Lyon & Lyon

[57] ABSTRACT

A system for controlling navigation, more particularly a current position recognition for a biped walking robot in a navigation environment. A map of the environment is prepared in advance. In the map shape features of an object such as stairs are predesignated. The robot has a vision sensor and in its navigation, the robot recognizes its current position from the shape feature. Evaluation functions are also preestablished for selecting one pair among the shape features, which are defined with respect a distance between the object and the robot and an angle determined by a pair of shape features in such a manner that two shape features existing not far from the robot and an angle determined by the two shape features are relatively large. A path is predesignated and robot motion is described in terms of basic walking patterns such as strait forward, direction change and step length adjustment. More specifically, robot joints are driven to realize the described motion such that the robot walks along the path.

16 Claims, 23 Drawing Sheets

FIG. 9

| Basic walking patterns | | Basic walking patterns | |
|---|---|---|---|
| (a) Straight N steps<br>Stop→Straight→Stop | | (c) Direction change (turning)<br>Stop→Turn→Stop | |
| (b) Stair climbing/descent<br>Stop→Climb→Stop<br>Stop→Descend→Stop | | (d) Step length adjustment (fore/aft)<br>Stop→Move→Stop | |
| | | (e) Stop length adjustment (right/left)<br>Stop→Move→Stop | |

Generation of essential intermediate point information

Checking of interference with obstacles

Using intermediate target points to generate obstacle avoidance path

Forbidden area

α : Angle determined by candidates 1 and 2
β : Angle determined by candidates 2 and 4

FIG. 21
Designation of destination
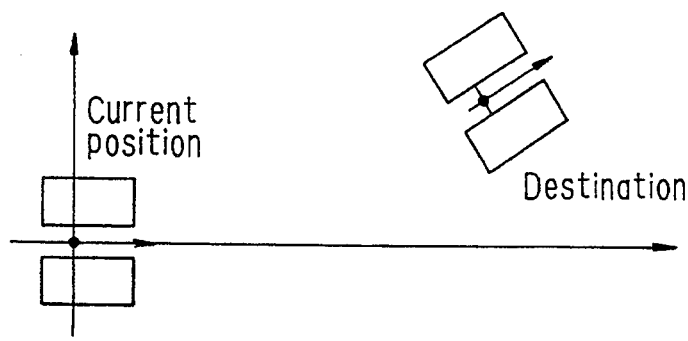
Translation into basic walking patterns
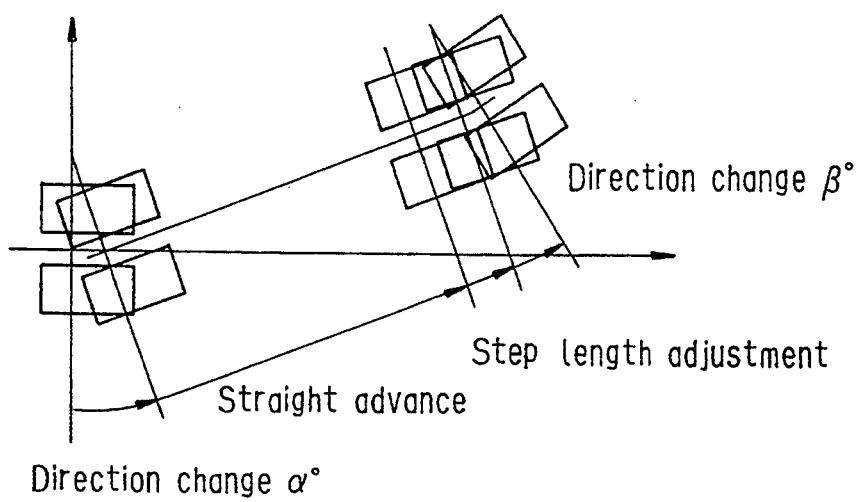

FIG.22
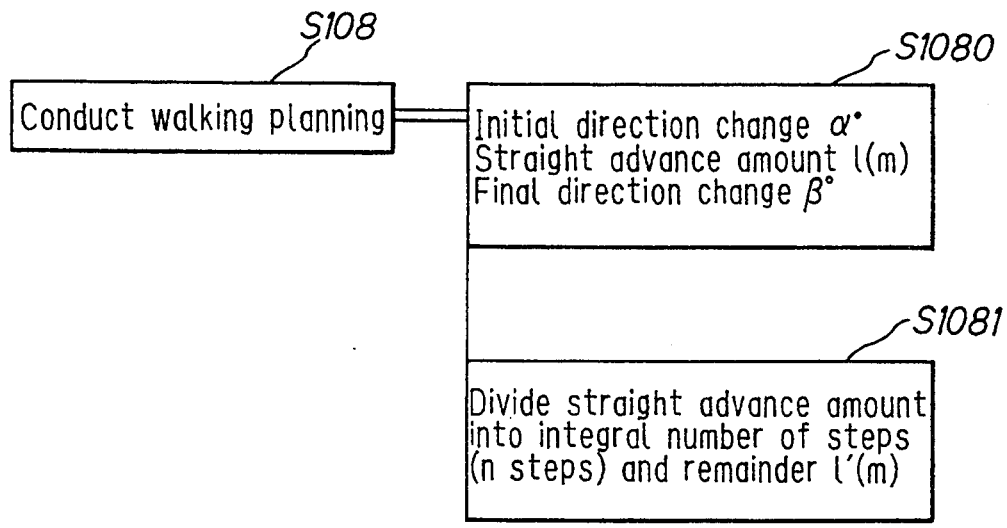
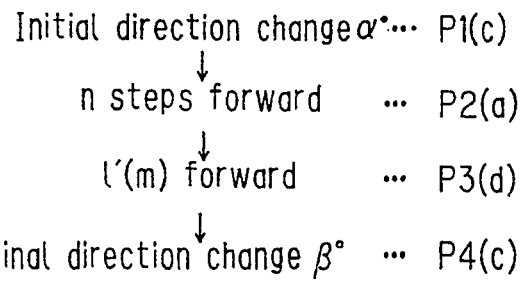
FIG.23
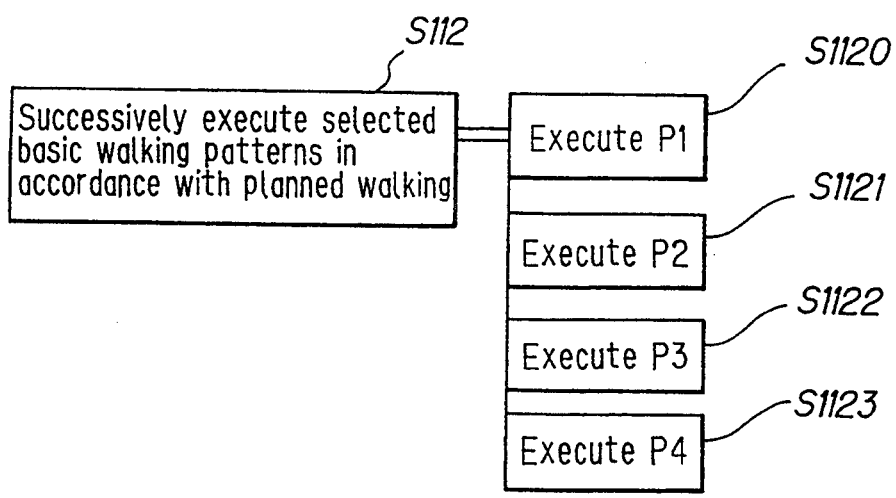

Recognition of shape feature points by image processing

Original image → Line depiction → Recognition of shape feature points

NAVIGATION CONTROL SYSTEM FOR MOBILE ROBOT

BACKGROUND OF THE INVENTION

1. Field of the Invention

This invention relates to a navigation control system and particularly for a current position recognition system for a mobile robot, and more particularly to such a system which enhances visual recognition processing speed and accuracy in a mobile robot which recognizes distinctive or characteristic shapes in its navigation environment which are suitable for a visual recognition algorithm and recognizes its own current position from the position of the recognized shapes.

2. Description of the Prior Art

Mobile robots have been proposed in a wide range of types, including the legged type taught by Japanese Laid-Open Patent Publication No. 62(1987)-97,005, the crawler type taught by Japanese Laid-Open Patent Publication No. 62(1987)-285,112, and the wheeled type. It is considered that such mobile robots can be designed to move while keeping track of their current position by visual recognition of the images of surrounding objects which are easy to see and of simple shape. During navigation indoors, such objects would include the ceiling and doors, for example. Visual recognition technologies are discussed in detail in, for example, "Machinery Research" Vol 43, No. 1 (1991) and "Journal of Japanese Society for Artificial Intelligence" Vol. 5, No. 6 (Nov. 1990).

In order to navigate through a complex environment, a mobile robot has to be able to ascertain its current position with high accuracy. A method which attempts to ascertain the current position from an object like a ceiling which is distant and whose position is hard to measure accurately is incapable of enabling an acceptable degree of navigation precision.

The obvious solution to this problem is to select nearby objects whose shapes are easy to recognize as the references for ascertaining current position with high accuracy. The problem with this approach, however, is that the objects within the navigation environment which have shapes etc. suitable for visual recognition provide such a large number of labels (features such as corners and colors) that it is difficult to select the features to be used unless they are defined in advance or the path to be navigated is specified beforehand.

SUMMARY OF THE INVENTION

The object of this invention is therefore to provide a navigation control system for a mobile robot which overcomes the aforesaid problems, more particularly to such a system which enables a mobile robot to use visual recognition to ascertain its current position in the environment in which it navigates, with high processing speed and high precision.

For realizing this object, the present invention provides a system for controlling navigation of a mobile robot having a vision sensor for recognizing spatial configuration of an environment within which the mobile robot moves, comprising first means for predesignating shape features of an object existing in the environment, second means for establishing an evaluation function defined at least with respect to a distance between the object and the mobile robot and an angle determined at least by a pair of shape features, and third means for selecting a pair of shape features among the shape features in accordance with the evaluation function to recognize a current position at which the mobile robot exists in the environment.

BRIEF DESCRIPTION OF THE DRAWINGS

The above and other objects and advantages of the invention will be more apparent from the following description and drawings, in which:

FIG. 9 is a view showing the basic walking patterns to be used in the operation of the flow chart of FIG. 4;

FIG. 21 is a view explaining translating the path to be navigated into the combinations of the basic walking patterns for moving the robot to the destination referred to in the flow chart of FIG. 14;

FIG. 22 is a flow chart showing the subroutine of flow chart of FIG. 14 for conducting walking planning;

FIG. 23 is a flow chart showing the subroutine of the flow chart of FIG. 14 for successively executing the determined basic walking patterns in accordance with the planned walking;

DETAILED DESCRIPTION OF THE PREFERRED EMBODIMENTS

Figure 1:
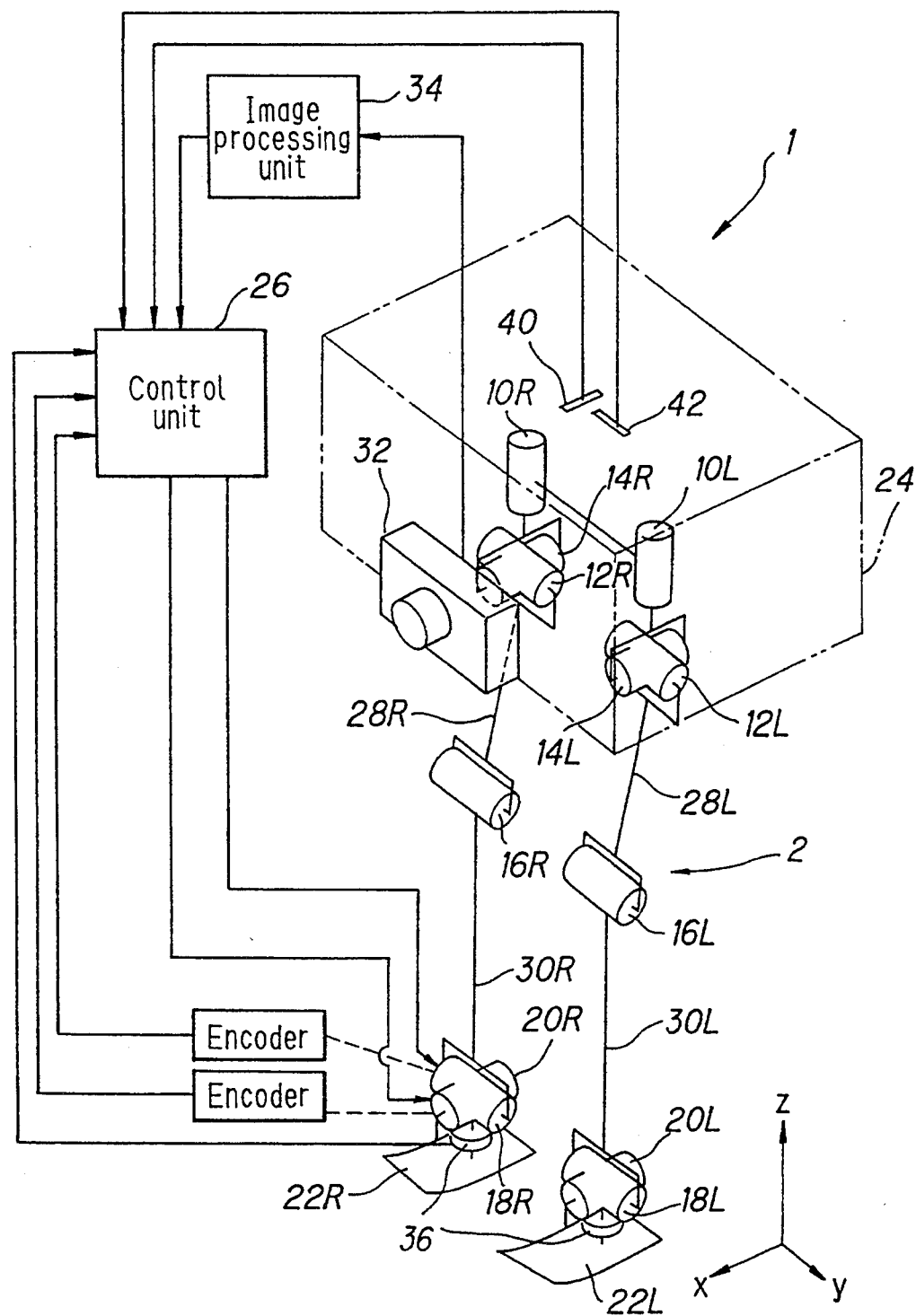
FIG. 1 is a schematic view showing the overall configuration of a navigation control system for a mobile robot according to the invention.

Embodiments of the invention will now be explained based on a biped robot as an example of a mobile robot. An overall skeleton view of a biped robot 1 is shown in FIG. 1. The robot 1 has left and right legs each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the roll direction (the rotation about y axis), joints (axes) 14R, 14L for rotation at the hip in the pitch direction (the rotation about the x axis), joints (axes) 16R, 16L for rotation at the knee in the roll direction, joints (axes) 18R, 18L for rotation at the ankle in the roll direction and joints (axes) 20R, 20L for rotation at the ankles in the pitch direction. Foot members 22R, 22L are provided at the lower end of this arrangement and a body (main unit) 24 housing the control unit 26 at the upper end.

The hip joints in the foregoing configuration are constituted by the joints (axes) 10R(L), 12R(L) and 14R(L) and the ankle joints by the joints (axes) 18R(L) and 20R(L). The leg links of the respective legs thus have six degrees of freedom, so that during locomotion the legs as a whole can be caused to execute the desired movements by driving the 6×2=12 joints (axes) to appropriate angles. The robot is thus capable of walking freely within three-dimensional space. (It will be noted that the hip and knee joints are connected by thigh links 28R, 28L and the knee and ankle joints by crus links 30R, 30L.) The joints are provided mainly with motors as was mentioned earlier and reduction gear mechanisms for increasing motor torque and so on. The structure of the joints is described in detail in the assignee's earlier Japanese Patent Application No. 1(1989)-324,218 (Japanese Laid-Open Patent Publication No. 3(1991)-184,782), etc., and since it is not an essential aspect of the present invention, will not be explained further here.

In the robot 1, a vision sensor 32 is mounted on the body 24 as illustrated in FIG. 1. The vision sensor 32 is a conventional CCD (charge-coupled solid-state imaging device) camera. An output of the vision sensor 32 is forwarded to an image processing unit 34 constituted as a microcomputer. And the ankles of the robot 1 of FIG. 1 are provided with six-dimensional force and torque sensors 36 for measuring the x, y and z direction force components transmitted to the robot from its foot members 22 and the moment components around the x, y and z axes, to detect whether or not the associated foot member 22 has landed and the magnitude and direction of the forces or moments acting on the supporting leg. The robot 1 is further provided at the top of the body 24 with a pair of inclination sensors 40, 42 for detecting the robot's inclination angle and angular velocity relative to z axis in the x-z and y-z planes. Each electric motor at the individual joints is provided with a rotary encoder for detecting the rotation of the motor. (In FIG. 1, only encoders associated with the right ankle joints are illustrated.) The outputs of the sensors are sent to the control unit 26.

Figure 2:
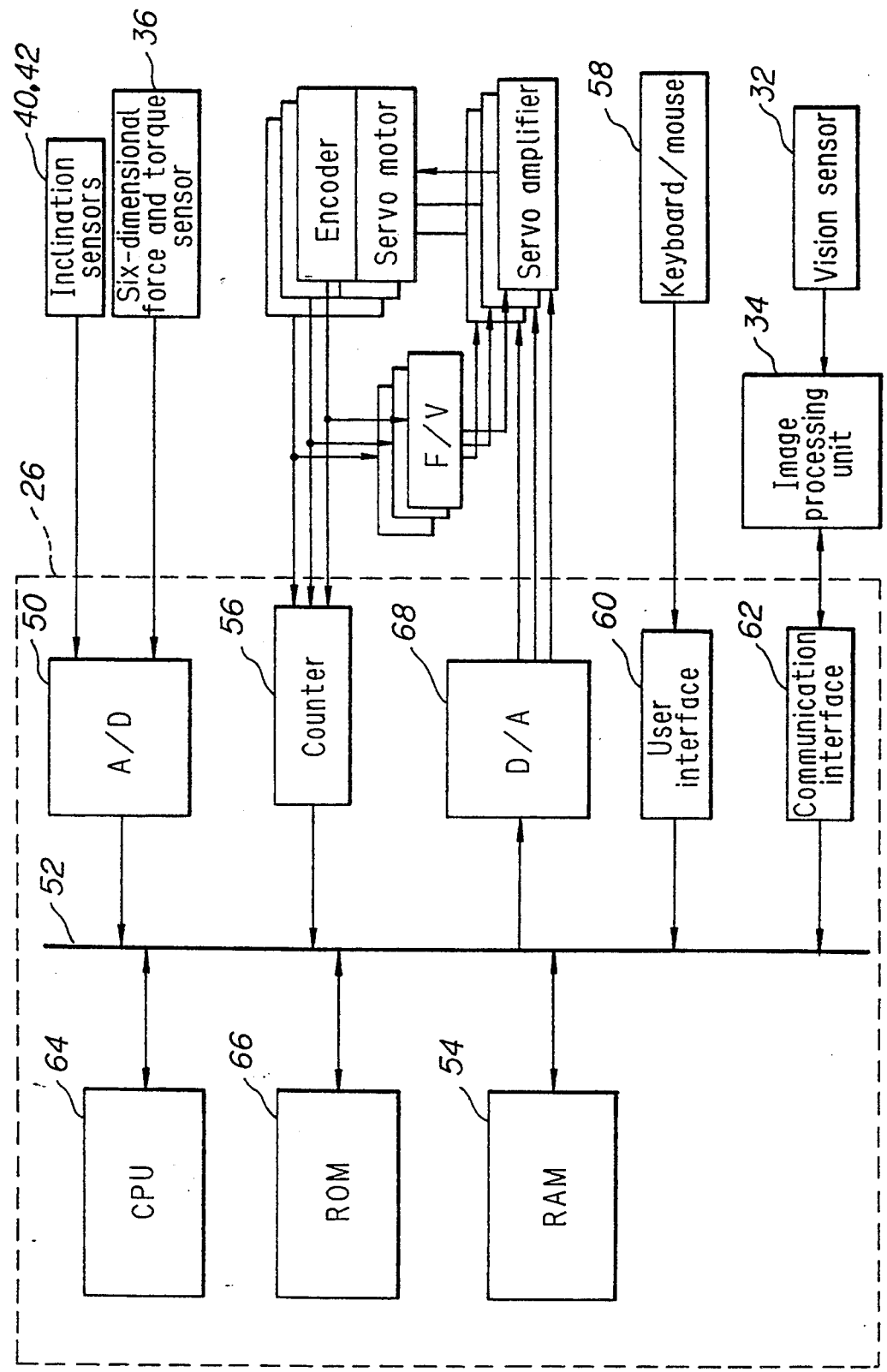
FIG. 2 is a block diagram showing the details of a control unit illustrated in FIG. 1.

As shown in the block diagram of FIG. 2, the control unit 26 has a microcomputer. The outputs from the inclination sensors 40, 42 etc. are converted into digital signals by an A/D converter 50 and the resulting digital values are sent via a bus 52 to a RAM (random access memory) 54 for storage. In addition, the outputs of encoders disposed adjacent to the respective motors are input to the RAM 54 through a counter 56. A keyboard and a mouse 58, not illustrated in FIG. 1, are provided to be used for a user (operator) to input information such as a destination in the robot's navigation or the like and their outputs are sent to the microcomputer via a user interface 60 also made up of a microcomputer. And an output from the aforesaid image processing unit 34 is similarly input to the microcomputer through a communication interface 62. The control unit 26 has a CPU 64 which, while recognizing a current position on the basis of an environment map prepared in advance and stored in a ROM (read-only memory) 66 as will be explained later in detail, determines target joint angles and computes velocity control commands of the individual joint motors by obtaining deviations between the target joint angles and actual joint angles learned from the outputs of the encoders. The CPU 64 sends the velocity control commands to an individual servo amplifiers via a D/A converter 68. Here, the outputs of the individual encoders are forwarded to the associated servo amplifier through a frequency/voltage converter.

The operation of the control unit will now be explained.

Figure 3:
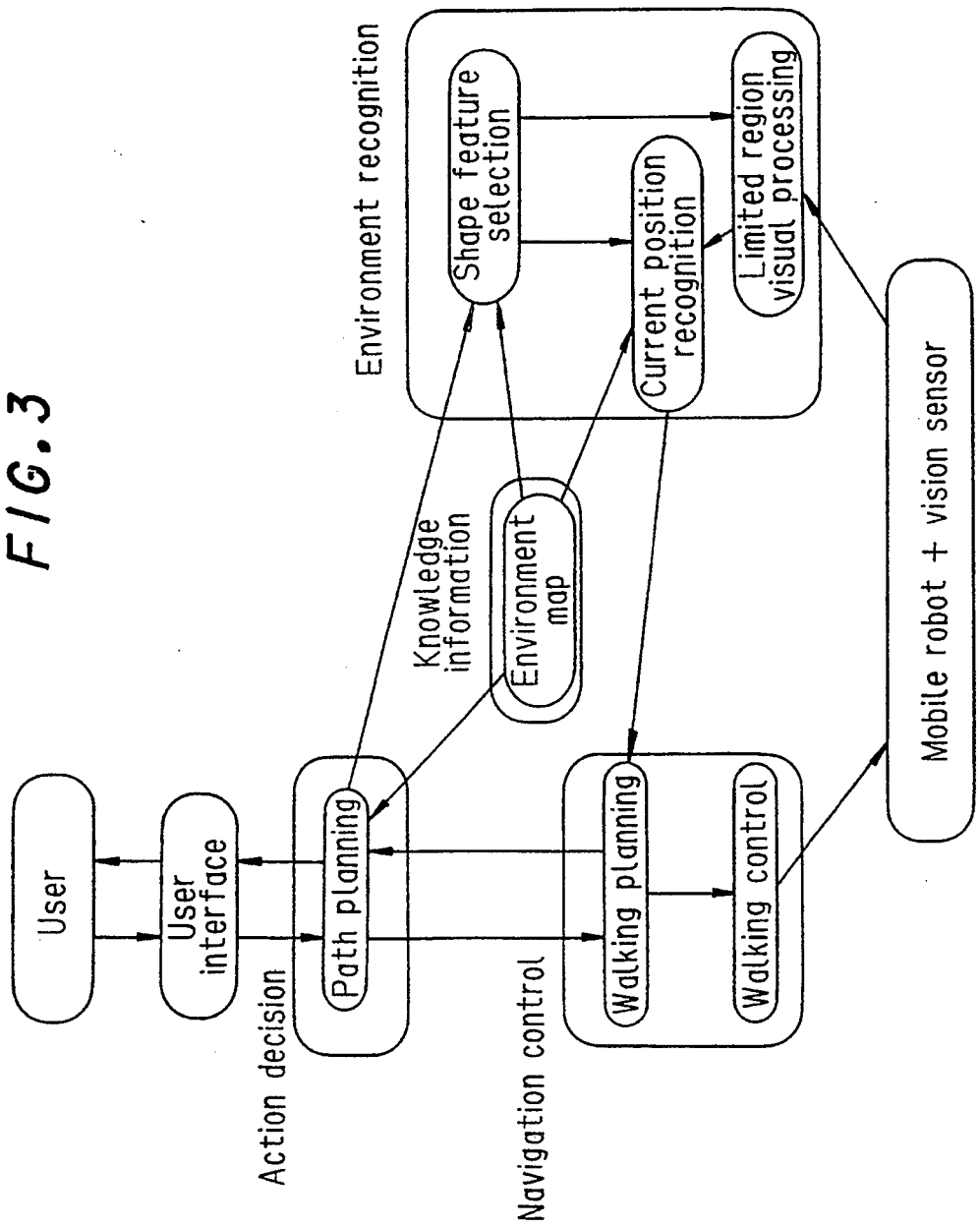
FIG. 3 is a block diagram showing the operation of the control unit focusing primarily on the environment recognition based on an environment map according to the invention.

FIG. 3 is a block diagram of the operation focusing primarily on the environment recognition. As shown, navigation control is conducted concurrently as the current position is recognized from the environment map stored in the ROM 66 using image information obtained via the vision sensor 32.

This will be explained in detail with respect to the flow chart (PAD diagram) of FIG. 4.

First, in step S10, the approximate value of the initial current position within the navigation environment (the position and orientation of the robot 1 at the start) is input. Control then passes to step S12 in which the destination, i.e. the location of the destination and the robot's orientation at the destination, are input. This is accomplished via the keyboard or mouse 58 and the user interface 60 shown in FIG. 2.

Figure 5:
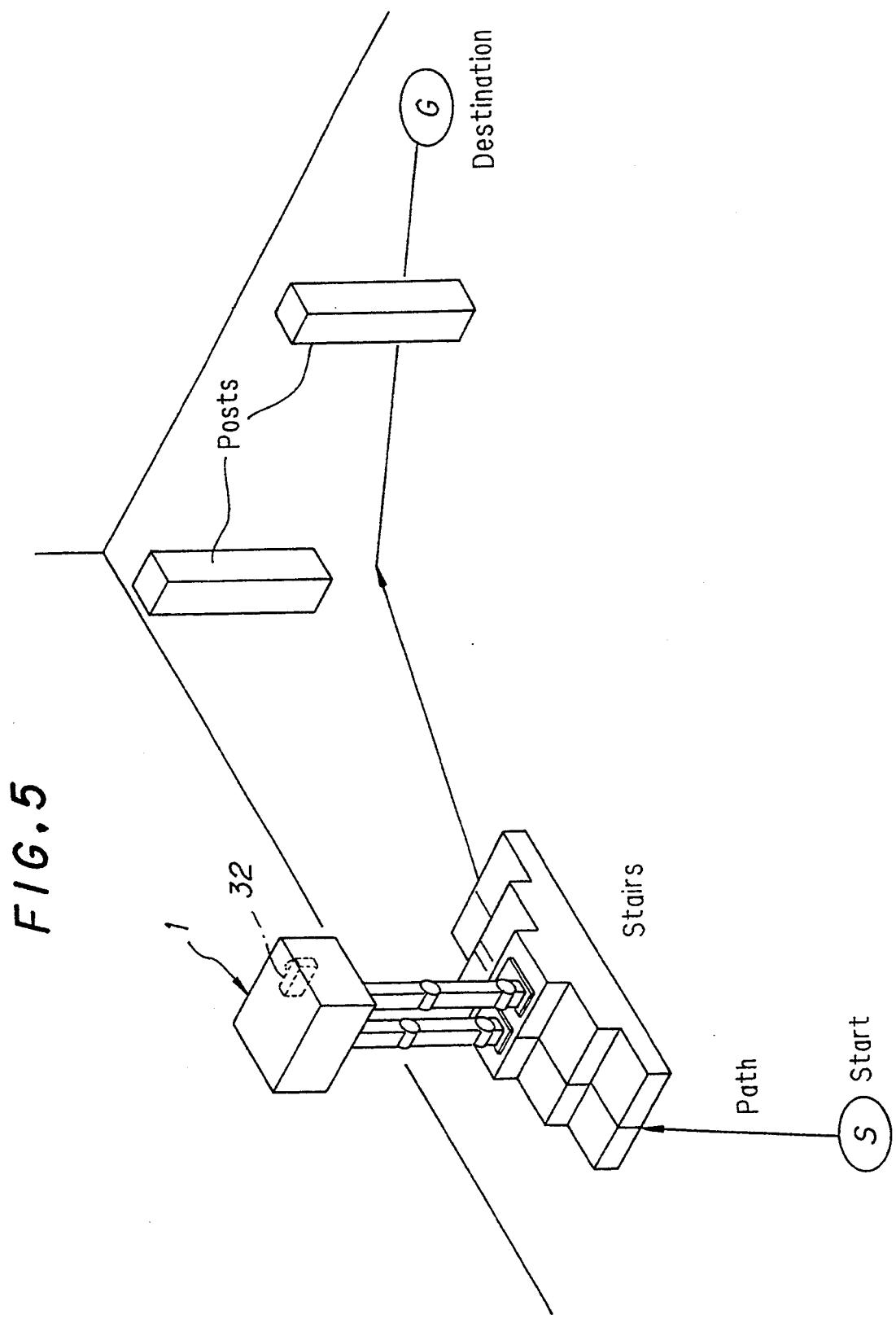
FIG. 5 is an explanatory view showing the environment expected in the flow chart of FIG. 4.
Figure 6:
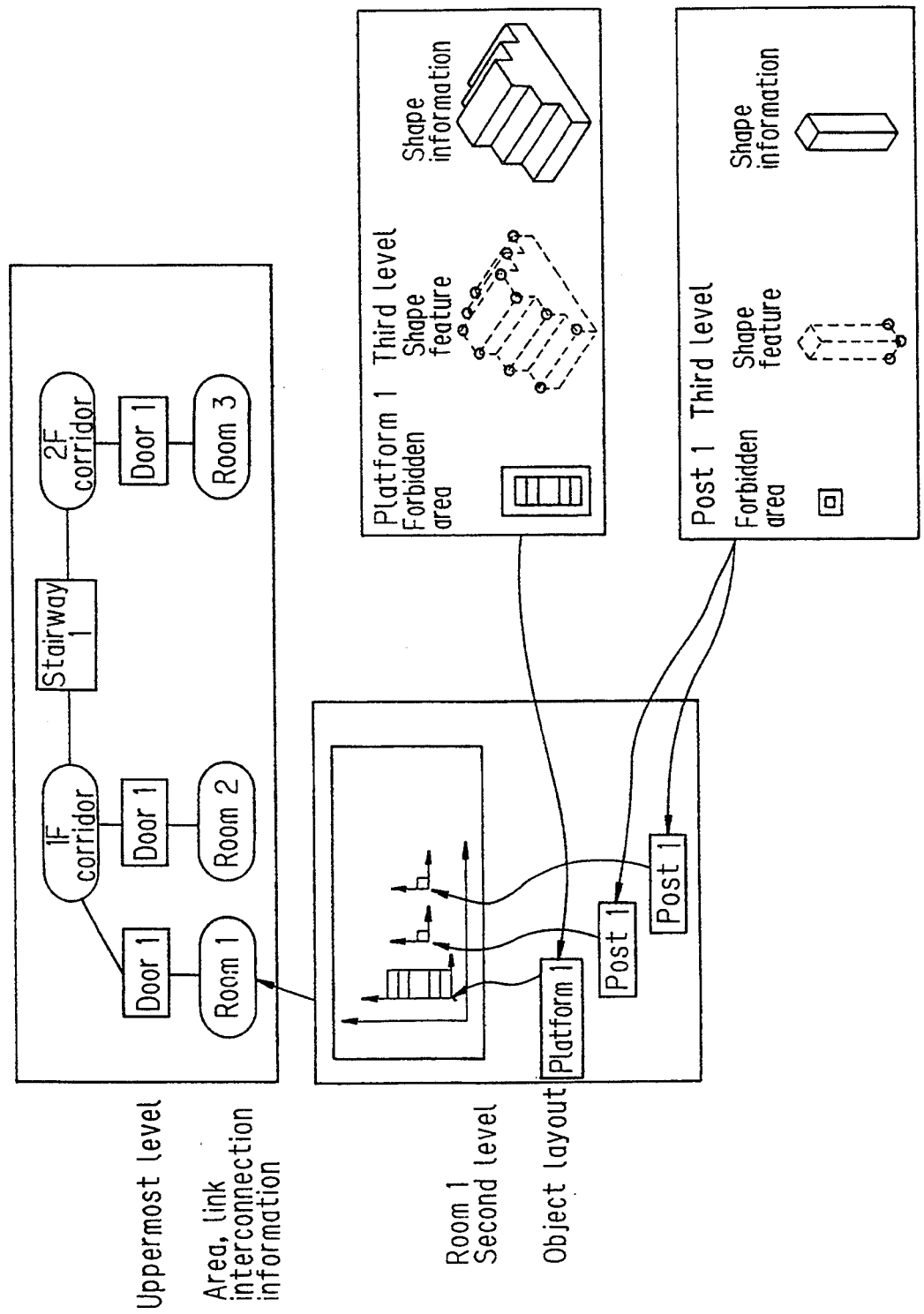
FIG. 6 is a view explaining the environment map illustrated in FIG. 3 and used in the operation.
Figure 7:
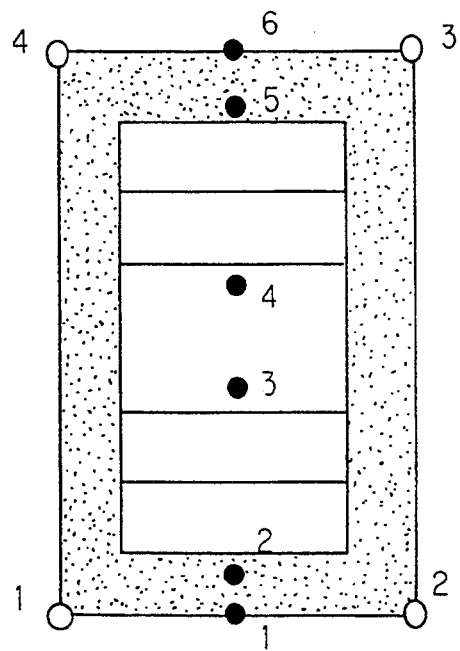
FIG. 7 is a view showing a portion of the environment map illustrated in FIG. 6.
Figure 8:
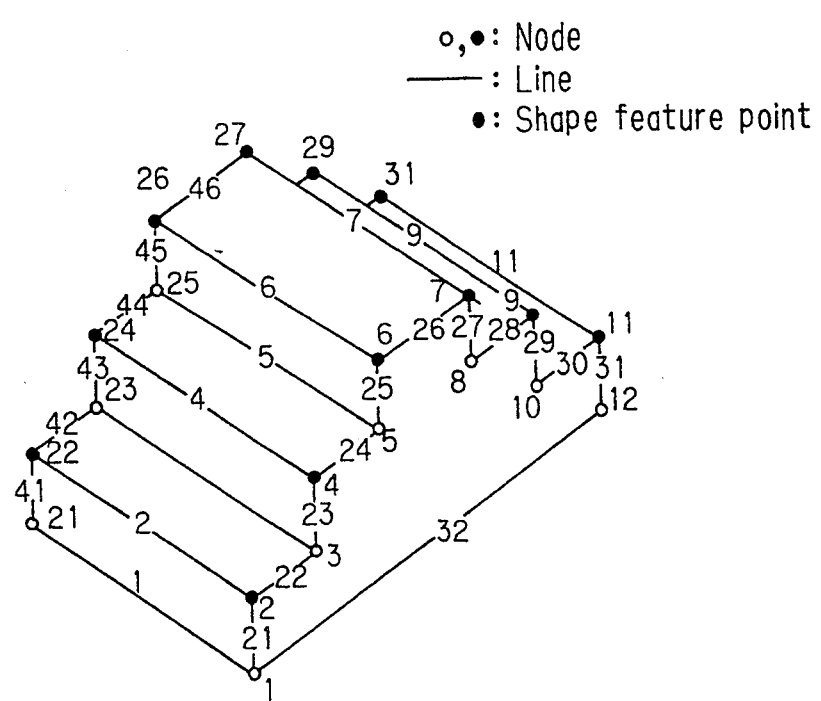
FIG. 8 is a view showing a portion of the environment map primarily focusing on the description of shape features of an obstacle in the environment map illustrated in FIG. 7.

The explanation of this embodiment will assume the indoor navigation environment shown in FIG. 5. Based on the commands input, the robot selects a path that takes it from the start position, up and down stairs, between a pair of posts, and to the destination. The navigation operations are conducted with reference to this path. As shown in FIG. 6, the environment map is described hierarchically, starting at the uppermost level and moving down through a second level to a third level. The uppermost level shows the interconnections within the building and is described in terms of area interconnections. The area is configured in rooms and links. By "room" is meant a space, e.g. a partitioned off space or corridor, which can be considered to be an area unit. By "link" is meant a place such as a stairway or door which has to be passed through to navigate among the rooms. Object layout information is described under the uppermost level as the second level. Under the second level, forbidden area information, shape feature information and the like are described as the third level. This is shown in detail in FIGS. 7 and 8. The aforesaid information is stored in the ROM 66 as the environment map. (In the following, the explanation will be limited to navigation in room no. 1 shown in FIG. 5.)

Figure 4:
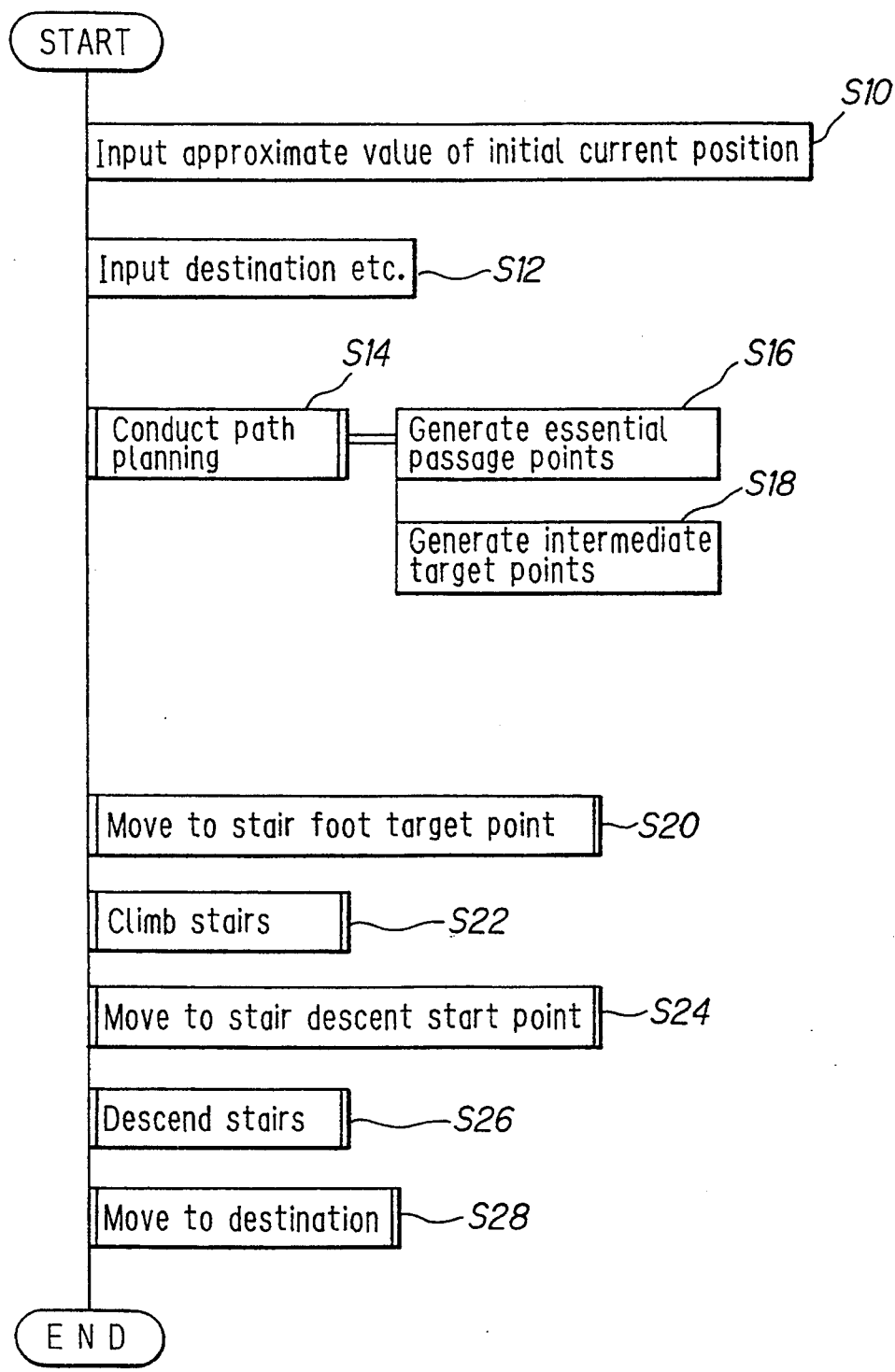
FIG. 4 is a flow chart realizing the operation of the control unit illustrated in FIG. 1.

Control then passes to step S14 in the flow chart of FIG. 4 in which path planning is conducted. It is not easy to freely control a legged mobile robot, particularly one using biped locomotion, so as to advance by a specified distance or to move along a designated path. Navigation control is, however, indispensable for achieving such movement. In this embodiment, the navigation is divided into several basic walking patterns. This enables navigation control solely by control processing for implementing the basic walking patterns. As shown in FIG. 9, five basic walking patterns are established in this embodiment: (a) straight forward, (b) stair climbing/descent, (c) direction change, (d) step length adjustment (fore/aft), and (e) step length adjustment (right/left). And as illustrated, since each pattern is established by being sandwiched by stop motions, it becomes easy to calculate equations of restraint conditions and at the same time to describe an obstacle avoidance path in a complicated environment. At the time of path planning in step S14, the path is expressed as interconnected basic walking patterns, not directly as a trajectory.

Figure 10:
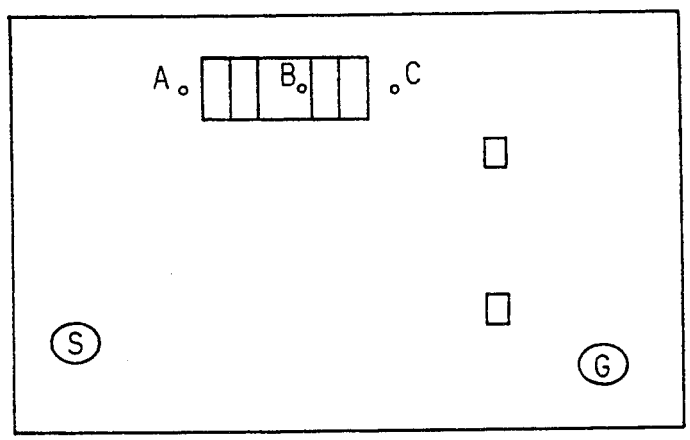
FIG. 10 is a view explaining generation of essential passage points referred to in the flow chart of FIG. 4.
Figure 11:
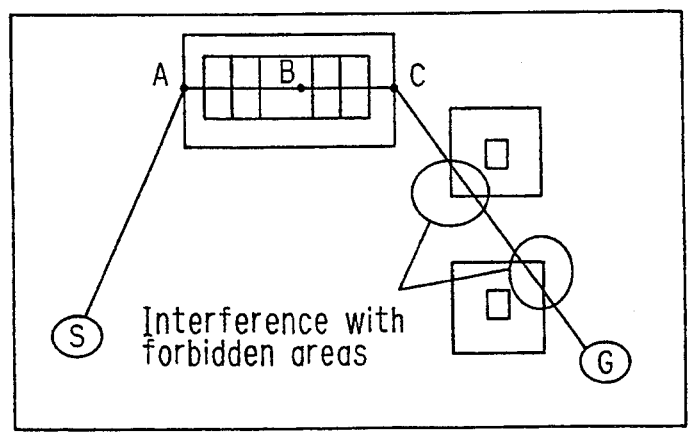
FIG. 11 is a view explaining generation of intermediate target points referred to in the flow chart of FIG. 4.
Figure 12:
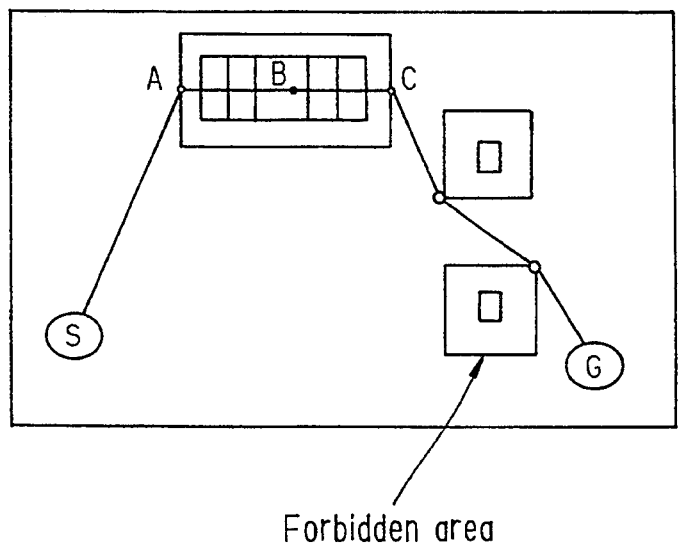
FIG. 12 is a view similar to FIG. 11.
Figure 13:
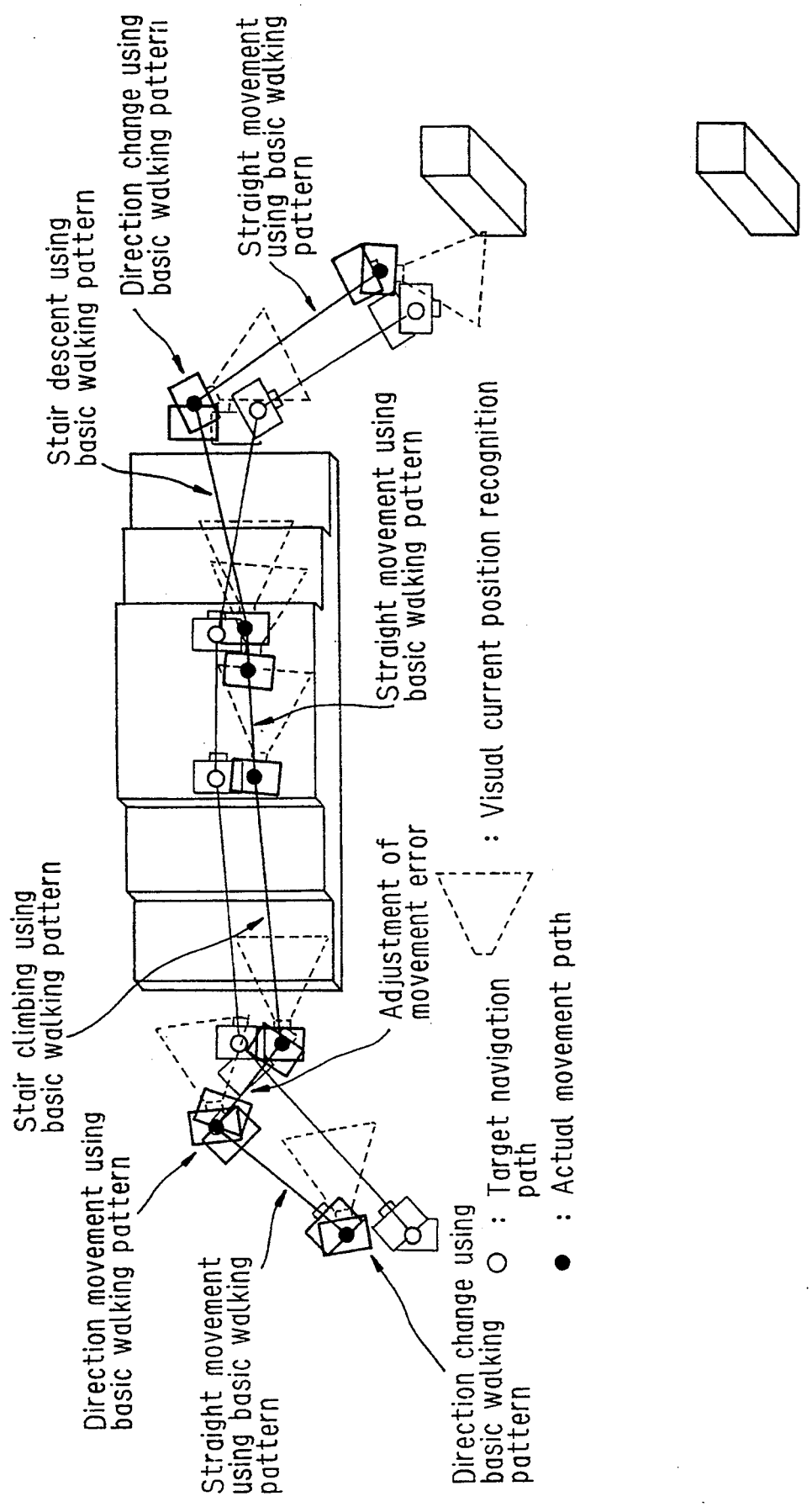
FIG. 13 is a view showing a path obtained through the generation of the essential passage points and intermediate target points referred to in the flow chart of FIG. 4.

As shown in FIG. 10, the actual path planning involves the generation of essential passage points (S16) and the generation of an obstacle avoidance path such as shown in FIG. 12 that takes into account the interference with obstacles such as shown in FIG. 11 (S18). For the purposes of this discussion, the essential passage points are defined as the stair foot target point A, the stair descent start point B, and the stair region departure point C. This is shown in more detail in FIG. 13.

Control then passes to step S20 of the flow chart of FIG. 4 in which navigation control for movement to the stair foot target point A is conducted.

Figure 14:
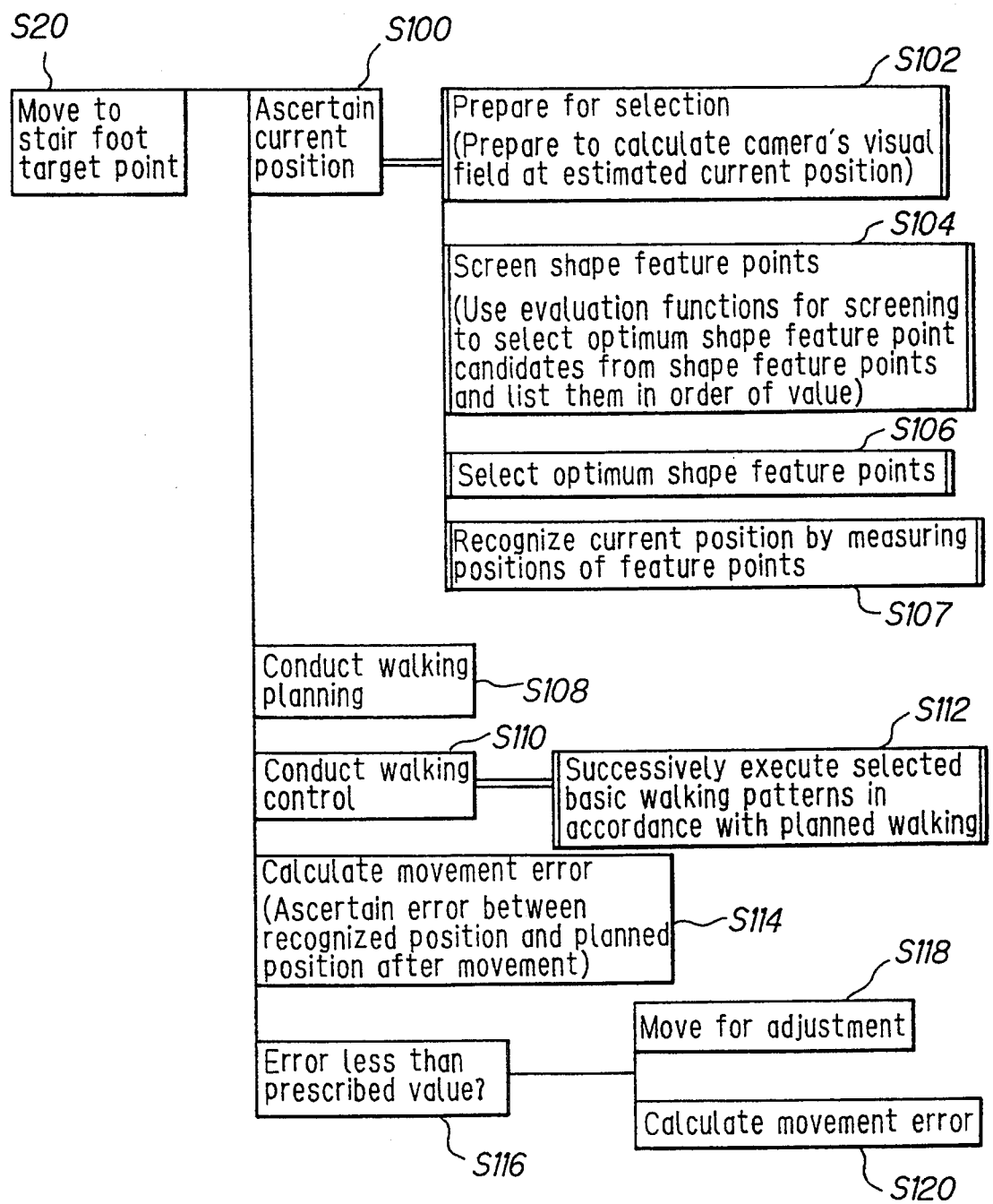
FIG. 14 is a flow chart showing the subroutine of the flow chart of FIG. 4 for moving to stair foot target point.
Figure 15:
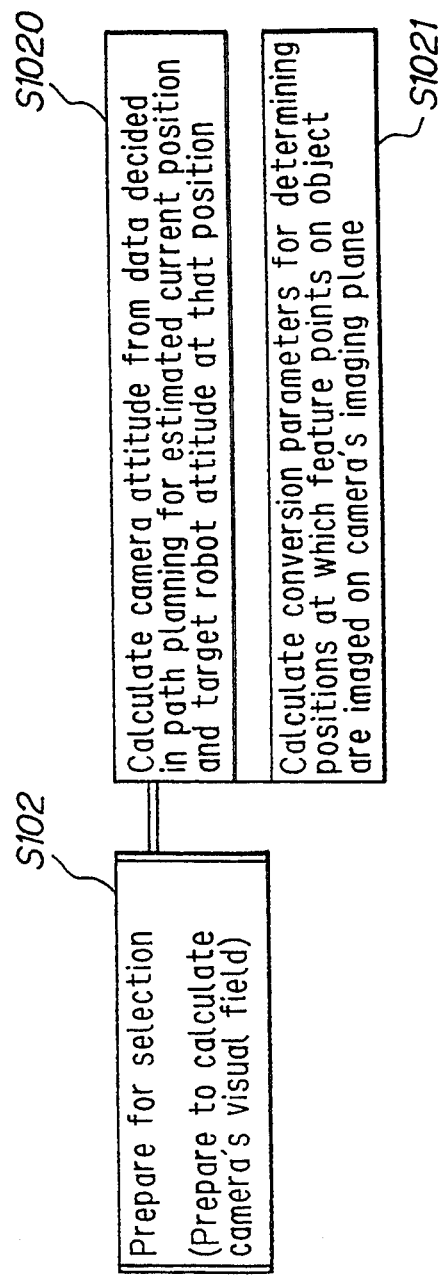
FIG. 15 is a flow chart showing the subroutine of the flow chart of FIG. 14 for preparing for selection.
Figure 16:
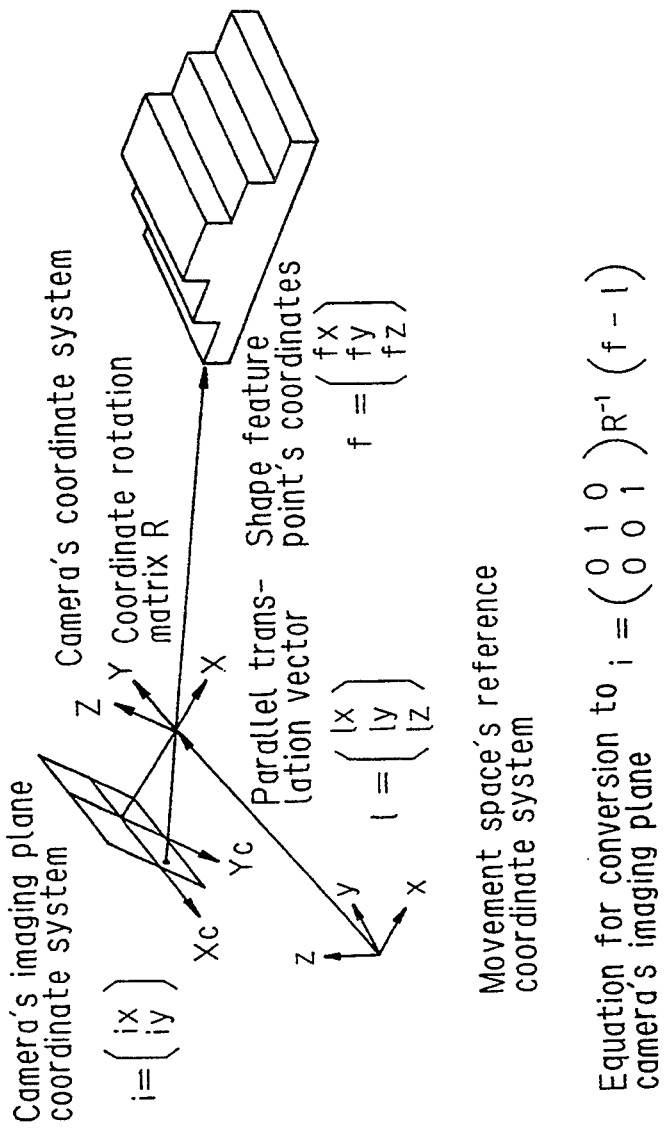
FIG. 16 is a view explaining the operation of flow chart of FIG. 15.

The subroutine for this is shown in FIG. 14. First, in step S100, the current position is ascertained. Specifically, preparation for selection processing is conducted in step S102. The subroutine for this is shown in FIG. 15. As noted in steps S1020 and S1021, the preparation for selection processing comprises of preparation for calculating the visual field of the camera (vision sensor 32) at the estimated current position. This is illustrated in FIG. 16.

Figure 17:
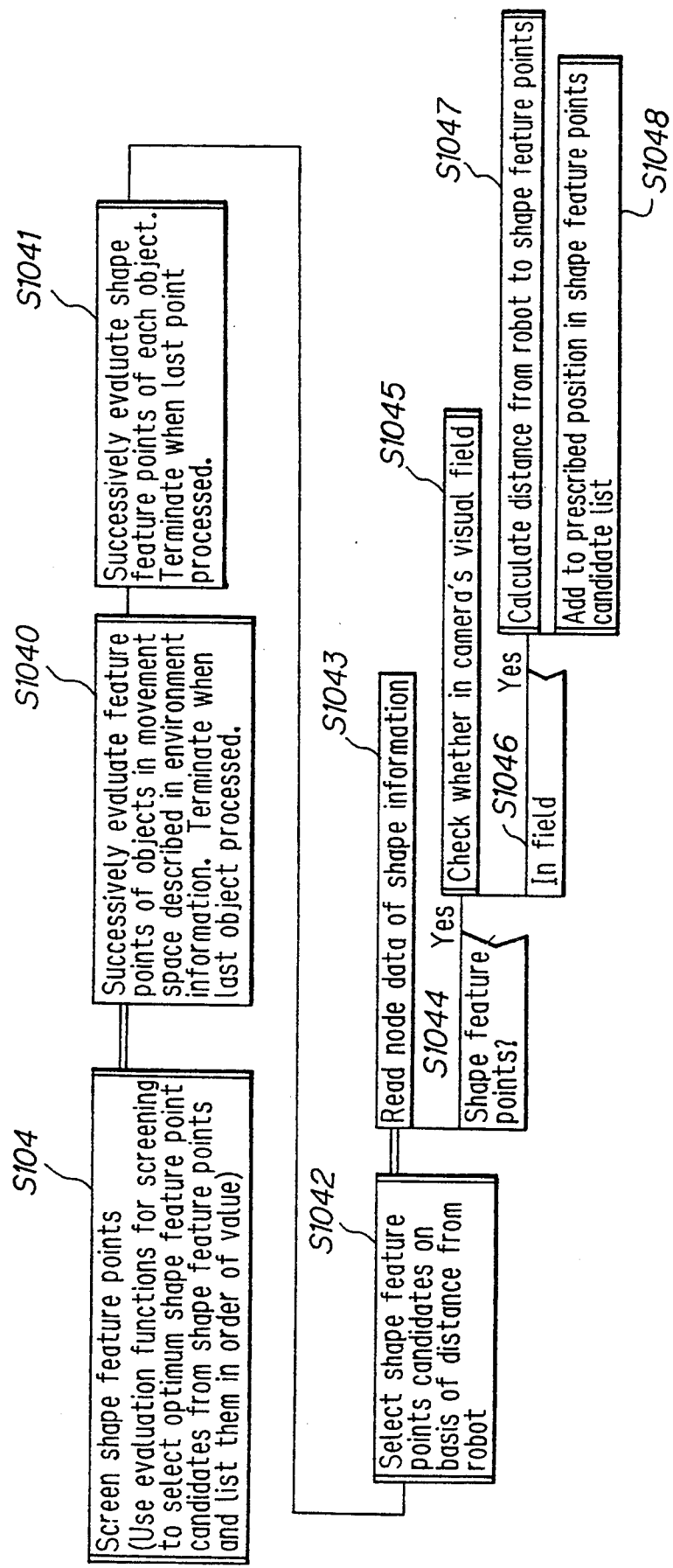
FIG. 17 is a flow chart showing the subroutine of the flow chart of FIG. 14 for screening shape feature points.

Control next passes to step S104 of the flow chart of FIG. 14 in which the shape feature points are screened. The subroutine for this is shown in FIG. 17. The screening of the shape feature points is aimed at selecting shape feature points from among those described in the environment information and is conducted by using first screening evaluation functions for evaluating all shape feature points of the whole object of the hierarchically described environment knowledge information (the points indicated in FIG. 8) and then listing candidate feature points in the order of the results of the evaluation. Since it is a general principle that recognition accuracy decreases and the probability of misidentification (confusion with another shape) increase with increasing distance of a point, there are adopted evaluation functions which relate the magnitude of recognition error to the distance from the robot. It suffices to list as many feature point candidates as are required for the ensuing processing for selection of the optimum shape feature points. The required number is specified in advance and any extra ones discarded. The discarding of over a certain number of shape feature points is not a requirement dictated by the principle of the invention, however, and all of the listed ones can be used if desired.

Figure 18:
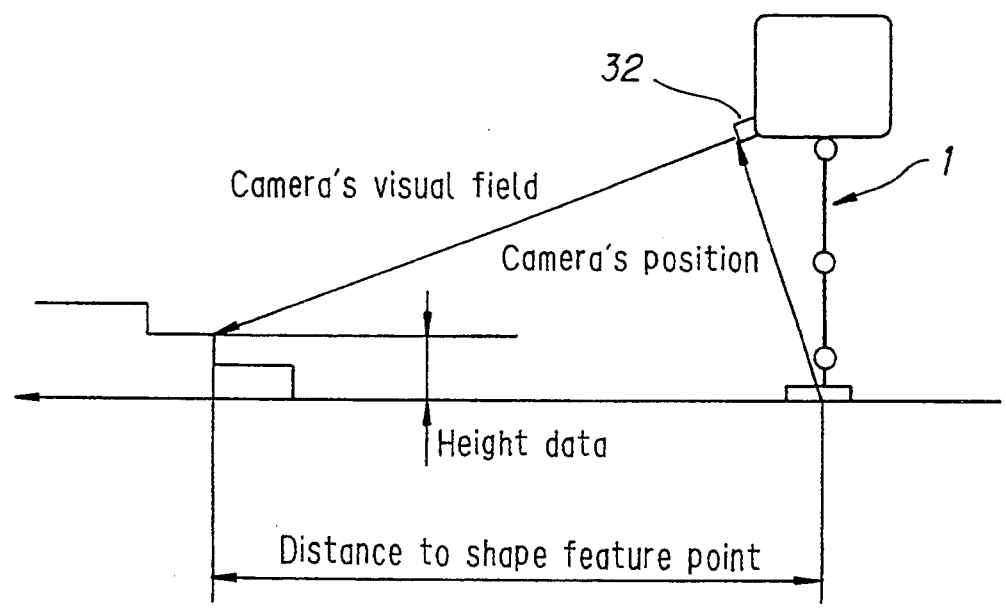
FIG. 18 is a view explaining the operation of the flow chart of FIG. 17.

To be specific, as indicated in steps S1040 to S1048 of the flow chart of FIG. 17, the shape feature points are selected from among the node data for the object concerned described in the environment information (see FIG. 8) and a check is made as to whether or not these shape feature points are within the field of vision of the camera at that time. Next, the distance between the robot and each shape feature point is calculated. Since the visual processing uses only a single lens, as shown in FIG. 18 the distance between the robot and the shape feature point is obtained as the distance to the point where the line of sight (the visual field) from the camera to the shape feature points intersects the height of the shape feature points described in the environment information.

Since this method can measure only the distance to the shape feature point, for determining the robot's current position it is necessary to determine the distance to at least one more shape feature point. The present embodiment determines the current position using the distance from two points, the minimum number necessary. The drawback of this method is that the directional error becomes large when the angle determined by the two points is small. To eliminate this problem, the selection of the optimum shape feature points in step S106 of the flow chart of FIG. 14 is conducted so as to keep the measurement error small.

Figure 19:
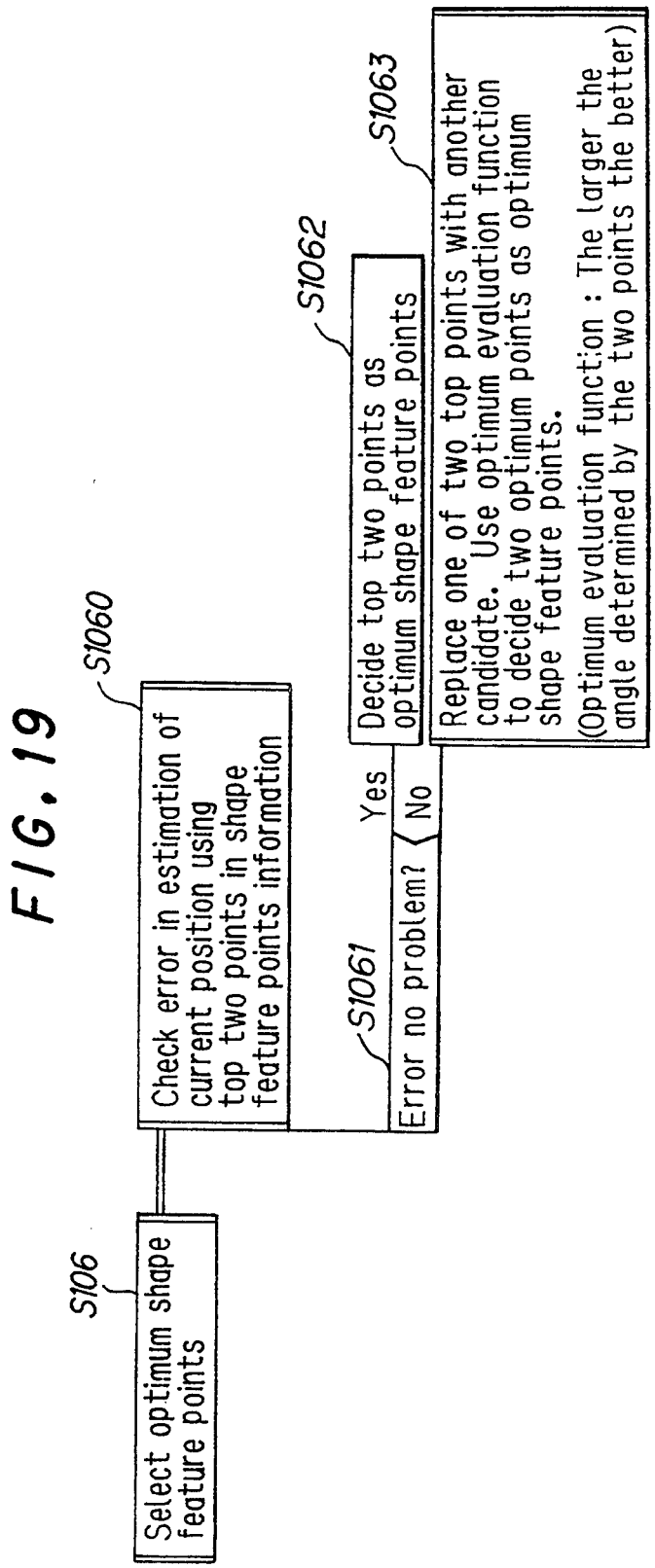
FIG. 19 is a flow chart showing the subroutine of the flow chart of FIG. 14 for selecting optimum shape feature points.
Figure 20:
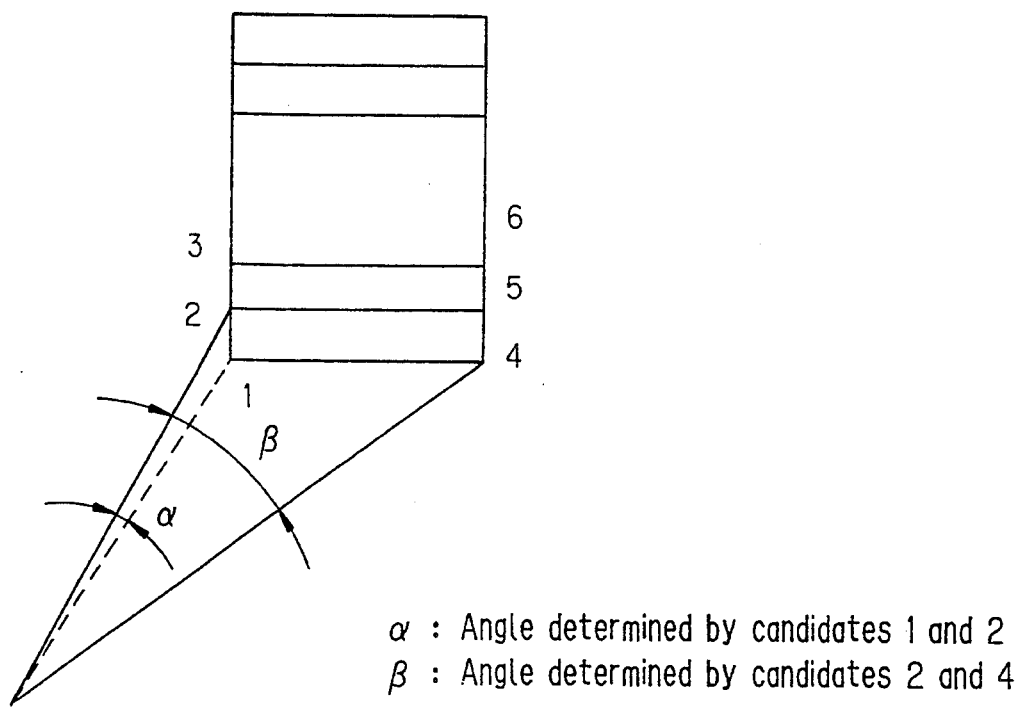
FIG. 20 is a view explaining the operation of flow chart of FIG. 19.

This is achieved by the subroutine for selection of the optimum shape feature points shown in FIG. 19. Specifically, if the angle determined by the top two shape feature points candidates is larger than the angle determined on the basis of the allowable error (the allowable angle), the two points are selected as the optimum shape feature points and the current position of the robot is calculated from these two points (S1060–S1062). On the other hand, if the determined angle is smaller than the allowable angle, a discrimination is made to determine whether or not it is possible to enlarge the angle by using two other points among the shape feature points candidates that are within the visual field (S1063). Since the time for checking all possible combinations increases sharply as the number of candidates increases, the present embodiment successively replaces only one of the top two points with the other candidates and determines the combination forming the largest angle as the optimum shape feature points. For example, as shown in FIG. 20, if the angle $\alpha$ determined by candidates 1 and 2 is smaller than the allowable angle, one of candidates 1 and 2 (in the illustrated example, candidate 1) is replaced with candidate 4 and the angle $\beta$ determined by this combination is compared with the allowable angle.

As the evaluation functions it is also possible to use functions related to the recognition probability of the visual recognition algorithm so as to avoid use of the feature points of a nearby shape which is easy to misidentify. For navigation through a complex environment, it is also possible to conduct current position recognition by the concurrent use of a plurality of environment recognition means (visual, sonar etc.). In such cases, it suffices to determine the shape feature points using evaluation functions defined with consideration to processing ease, recognition accuracy and the like.

Returning to the flow chart of FIG. 14, after step S107 has recognized the current position through measurement of the positions of the selected feature points, control passes to step S108 in which locomotion planning is conducted. As will be understood from FIG. 21, this is the work of translating the path to be navigated into a combination of the aforesaid basic walking patterns for moving the robot to the destination. The subroutine for this is shown in FIG. 22. In step S1080 of this subroutine the turning angles and the like are determined in step S1080, whereafter the number of steps and the remainder (distance less than a full step length) are determined. As shown at the bottom of FIG. 22, a walking plan is made for the robot to turn by the angle $\alpha$(mode P1), advance n steps (mode P2), adjust the step length to and advance by $l'$ m (mode P3), and turn by the angle $\beta$ (mode P4). The symbols (a) etc. after the respective modes indicate the corresponding basic walking patterns shown in FIG. 9.

Control next passes to step S110 in the flow chart of FIG. 14 in which walking control is conducted. As shown in step S112, this means successively executing the selected basic walking patterns according to the planned walking. The subroutine for this is shown in FIG. 23, in which the control values are determined so as to successively execute patterns P1 to P4, shown in FIG. 22, in steps S1120 to S1123. Here it is important to note that the control at this stage amounts to determining the angle command values for the twelve joints shown in FIG. 1 so as to realize the combination of the desired basic walking patterns. More specifically, the control is conducted by driving the respective motors through the associated servo amplifier so as to eliminate the discrepancy between the angle command values and the actual values learned from the encoders. Since this control is not the object of the present invention, however, it will not be explained further here.

Figure 24:
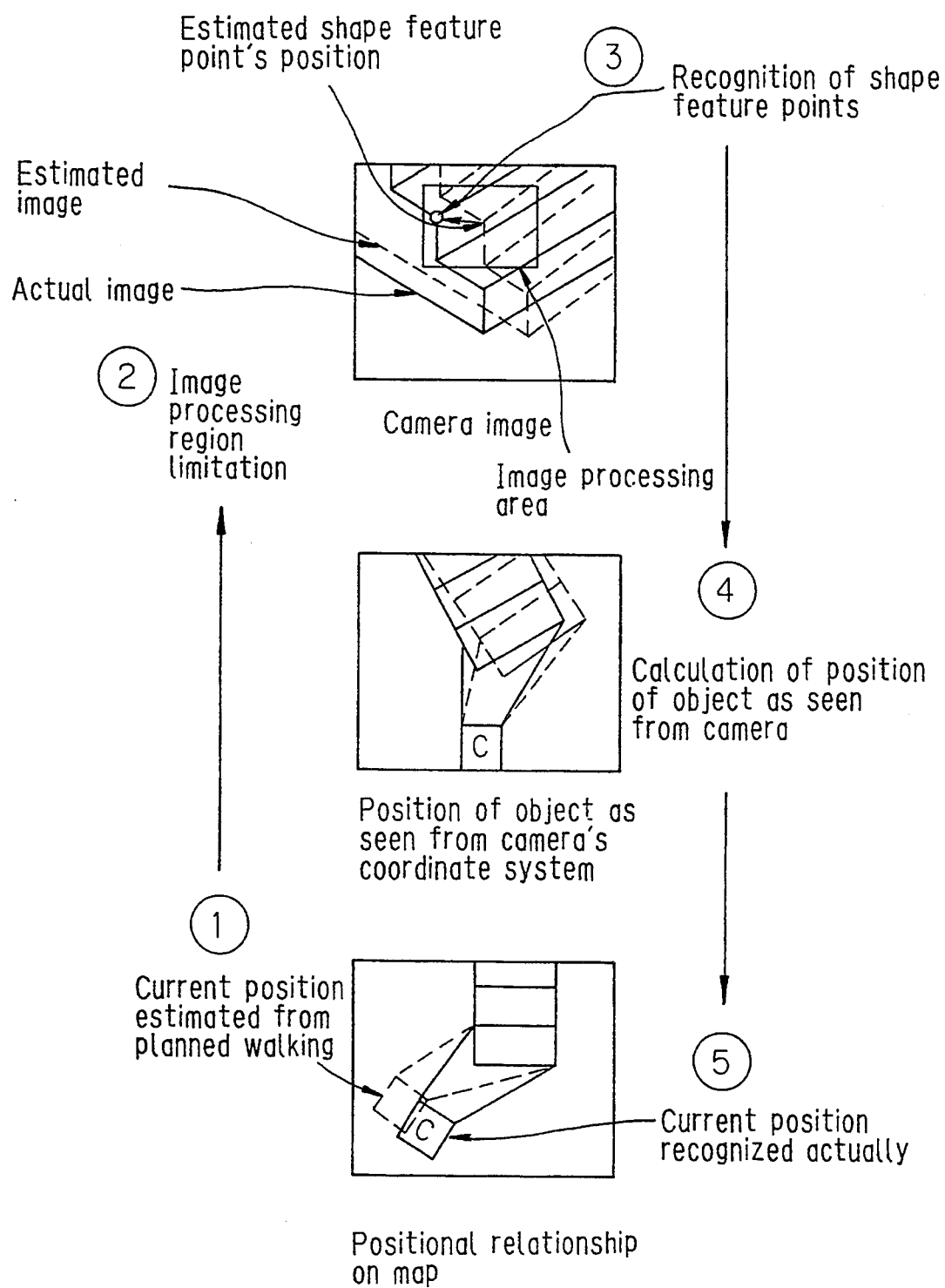
FIG. 24 is a view explaining the movement error between the current position estimated in the planned walking and the current position actually recognized.
Figure 25:
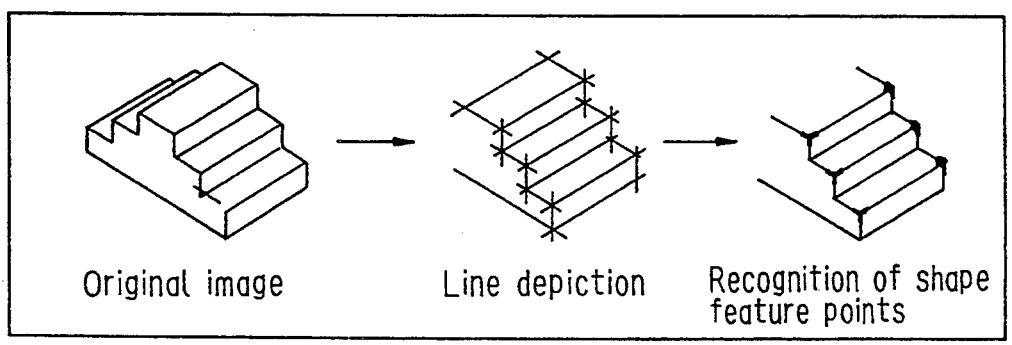
FIG. 25 is a view explaining how image processing is used for recognizing shape feature points.

Control then passes to step S114 in the flow chart of FIG. 14, in which navigation error is calculated. This involves conducting current position recognition similar to that in step S100 with respect to the estimated current position after the robot has been moved to the destination (foot of the stairs) by the command values. Control then passes through steps S116 to S120 in which it is judged whether or not the error exceeds a prescribed value, and if it does, adjusting movement is repeated until it falls to or below the prescribed value. FIG. 24 shows how the movement error is determined from the current position estimated from the command values and the current position actually determined through the vision sensor 32. FIG. 25 is a diagram for explaining how image processing is used for recognizing shape feature points.

Control next passes through steps S22 to S28 of the flow chart of FIG. 4, for conducting stair climbing operations and the like. This involves recognition of the current position, walking (navigation) control, recognition of navigation error, and correction of the navigation error. Since it is substantially the same as what was explained regarding movement to the target point at the foot of the stairs in step S20, it will not be explained further.

In this embodiment, all shape feature points of the obstacles present in the anticipated navigation space are described in the environment map, predefined evaluation functions are used to select from among these shape feature points those which are within a prescribed distance from the robot, and input image data for the vicinity of these candidate shape feature points is used to select a pair of shape feature points. If the pair of shape feature points determined an angle larger than a prescribed allowable angle, the current position is ascertained from the pair of shape feature points. If the angle determined by the pair of shape feature points is smaller than the allowable angle, one of the pair is successively replaced by the other candidates and the combination which forms the largest angle is selected and used for ascertaining the current position. In addition, the navigation error is determined not with respect to the absolute position but with respect to the relative position, namely by finding the difference between the current position estimated from the planned walking and the actual current position obtained through the vision sensor, and if it exceeds the allowable error, correction movement is conducted. Owing to this configuration, it is possible to conduct environment recognition with respect to shape feature points appropriate for recognizing the current position at high speed and with high accuracy. Since the feature points are described in the environment map, it is possible to recognize the positions of feature points at various different navigation locations, which in turn makes it possible to recognize current position with a simple system configuration.

Figure 26:
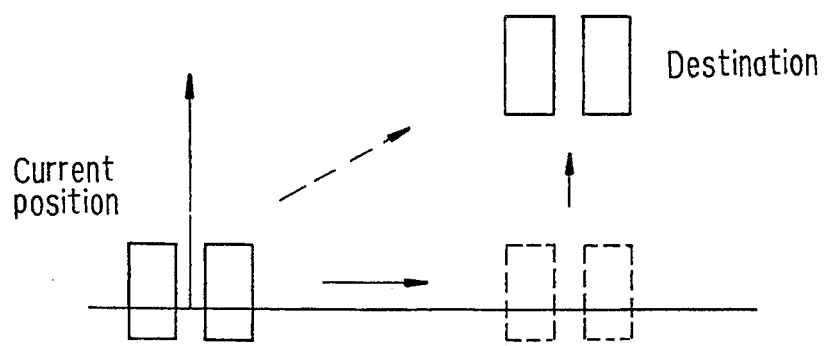
FIG. 26 is view, similar to FIG. 21, but showing another example of the translation of the path into the combination of the basic walking patterns.

The translation of the path to be navigated into the basic walking patterns in FIG. 21 can be achieved in many different ways. In the case of FIG. 26, for example, it is possible first to adjust the right/left step length and then advance straight forward, while in FIG. 21 it is possible to change directions before advancing straight ahead and then to execute another direction change.

While the invention was described with respect to an embodiment employing a single vision sensor, it is also possible to use a binocular stereo vision sensory device.

Moreover, while the invention was described with respect to a biped walking robot as an example of a mobile robot, the invention can also be applied to wheeled and crawler robots or the like.

The present invention has thus been shown and described with reference to the specific embodiments. However, it should be noted that the present invention is in no way limited to details of the described arrangements, changes and modifications may be made without departing from the scope of the appended claims.

What is claimed is:

1. A system for controlling navigation of a mobile robot comprising:
    a vision sensor for sensing a spatial configuration of an environment in which the robot moves;
    first means for predesignating shape features of an object existing in the environment;
    second means for preestablishing an evaluation function defined at least with respect to a distance between the object and the mobile robot and an angle determined at least by a pair of shape features; and
    third means for selecting at least one pair of shade features among the shape features in accordance with the evaluation function to measure distances from the pair of shape features so as to recognize a current position of the mobile robot in the environment.

2. A system for controlling navigation of a legged mobile robot having a single vision sensor for recognizing spatial configuration of an environment in a building within which the mobile robot moves, comprising:
- first means for preestablishing a map of the environment describing an object having shape features and a forbidden area defined around the object;
- second means for predesignating a path along which the mobile robot moves;
- third means for predesignating shape features of the object existing in the environment;
- fourth means for preestablishing an evaluation function defined at least with respect to a distance between the object and the mobile robot;
- fifth means for selecting one among the shape features in accordance with the evaluation function to recognize a current position of the mobile robot;
- sixth means for determining a positional error from the path predesignated by said second means; and
- seventh means for moving the mobile robot to decrease the positional error.

3. A system according to claim 2, wherein the evaluation function is defined at least with respect to the distance and an angle determined at least by a pair of shape features, and said fifth means selects a pair of shape features in accordance with the evaluation function to measure distances from the pair of shape feature so as to recognize the current position of the robot in the environment.

4. A system according to claim 3, wherein said fifth means selects the pair of shape features after having confirmed that an angle determined by the pair of shape features exceeds a reference value.

5. A system according to claim 4, wherein said fifth means replaces one of the shape features with another if the angle does not exceed the reference value and selects the two shape features after having confirmed that an angle determined by the two shape features exceeds the reference value.

6. A system according to claim 2, wherein said second means predesignates the path by predesignating target points to be passed in the environment.

7. A system for controlling navigation of a legged walking robot having a body and a plurality of legs connected to the body and provided with a vision sensor for recognizing spatial configuration of an environment in a building within which the mobile robot walks, comprising:
- first means for preestablishing a map of the environment describing an object having shape features and a forbidden area around the object;
- second means for predesignating a path along which the robot walks;
- third means for predesignating motion of the robot such that the robot walks along the path;
- fourth means for predesignating shape features of the object;
- fifth means for preestablishing an evaluation function defined at least with respect to a distance between the object and the mobile robot;
- sixth means for selecting one among the shape features in accordance with the evaluation function to recognize a current position of the mobile robot;
- seventh means for determining a positional error from the path predesignated by said second means; and
- eighth means for moving the legged walking robot to decrease the positional error.

8. A system according to claim 7, wherein said third means predesignates the motion of the robot in a combination of basic walking patterns of the robot each sandwiched by a stop motion.

9. A system according to claim 8, wherein the basic walking patterns include at least one among straight forward, stair climbing/descent, direction change and step adjustment in fore/aft or right/left directions, each sandwiched by a stop motion.

10. A system according to claim 7, wherein the evaluation function is defined at least with respect to the distance and an angle determined at least by a pair of shape features, and said sixth means selects a pair of shape features in accordance with the evaluation function to measure distances from the pair of shape features so as to recognize the current position of the robot in the environment.

11. A system according to claim 10, wherein said sixth means selects the pair of shape features after having that an angle determined by the pair of shape features exceeds a reference value.

12. A system according to claim 11, wherein said sixth means replaces one of the shape features with another if the angle does not exceed the reference value and selects the two shape features after having confirmed that an angle determined by the two shape features exceeds the reference value.

13. A system according to claim 7, wherein said second means predesignates the path by predesignating target points to be passed in the environment.

14. A system for controlling navigation of a legged walking robot having a body and a plurality of articulated legs each having at least a first joint and connected to the body through a second joint, comprising:
- first means for determining a path along which the robot walks;
- second means for predetermining motion of the robot in a combination of basic walking patterns each sandwiched by a stop motion; and
- third means for driving the joints of the robot to realize the basic walking patterns such that the robot walks along the path.

15. A system according to claim 14, wherein the basic walking patterns include at least one among straight forward, stair climbing/descent, direction change and step adjustment in fore/aft or right/left directions, each sandwiched by a stop motion.

16. In a biped walking robot of the type having a pair of legs articulated to a body, the improvement comprising:
- a system for controlling movement of the robot through an environment having an object, including:
  - a vision sensor;
  - predesignating means for predesignating shape features of an object in the environment;
  - evaluation function means for establishing an evaluation function defined at least with respect to a distance between the object and the robot, and an angle determined at least by a pair of shape features; and
  - selecting means for selecting a pair of shape features in accordance with the evaluation function, to determine the current position of the robot in the environment.

* * * * *